United States Patent [19]

Higashino et al.

[11] Patent Number: 5,364,331
[45] Date of Patent: Nov. 15, 1994

[54] HEAT RESISTANT ROLL FOR USE IN STEEL PLATE MANUFACTURING EQUIPMENT

[75] Inventors: Tetsuo Higashino, Omihachiman; Shosaku Nakamura, Echi; Akira Iimurou; Misao Maeyama, both of Uzi; Yoshimi Fukushige, Itami; Tomoyuki Harada, Yahatanishi, all of Japan

[73] Assignee: Tohoyogyo Co., Ltd., Shiga, Japan

[21] Appl. No.: 34,749

[22] Filed: Mar. 18, 1993

[30] Foreign Application Priority Data

Aug. 31, 1992 [JP] Japan .................. 4-67186[U]

[51] Int. Cl.⁵ .................................. B32B 15/08
[52] U.S. Cl. ............................... 492/43; 492/56
[58] Field of Search ............... 492/56, 43; 428/446

[56] References Cited

U.S. PATENT DOCUMENTS

| | | | |
|---|---|---|---|
| 3,686,731 | 8/1972 | Koori et al. | 492/56 |
| 4,074,001 | 2/1978 | Imai et al. | 492/56 |
| 4,632,855 | 12/1986 | Conlon et al. | 492/56 |
| 4,777,087 | 10/1988 | Heeks et al. | 492/56 |
| 4,807,341 | 2/1989 | Nelsen et al. | 492/56 |
| 4,897,119 | 1/1990 | Clarke . | |

Primary Examiner—Irene Cuda
Attorney, Agent, or Firm—Jones, Tullar & Cooper

[57] ABSTRACT

The outer periphery of a heat resistant roll comprises a para aromatic polyamide fiber. The heat resistant roll is applied for conveying and picking up a steel plate heated to a high temperature. The heat resistant roll is preferably applied to the inside of a continuous annealing apparatus for annealing the steel plate or to the exit side of this apparatus. The heat resistant roll is also preferably applied to the exit side of a baking furnace in a continuous coating apparatus for coating the steel plate. The heat resistant roll is also preferably applied to the exit side of a galvanization tank in a zinc galvanizing apparatus.

8 Claims, 2 Drawing Sheets ized in that outer periphery of said heat resistant roll applied in contact with steel plate heated to a high temperature is comprised of para aromatic polyamide fiber.

HEAT RESISTANT ROLL FOR USE IN STEEL PLATE MANUFACTURING EQUIPMENT

CROSS REFERENCE TO RELATED APPLICATION

This application discloses subject matter in common with application, Ser. No. 08/034,751, now U.S. Pat. No. 5,309,631.

BACKGROUND OF THE INVENTION

1. Industrial Field

The present invention relates to a heat resistant roll for use in steel plate manufacturing equipment and, more particularly, to a heat resistant roll applicable to continuous annealing apparatus, exit side of baking furnace of continuous coating apparatus or exit side of galvanizing tank of continuous zinc galvanizing apparatus.

2. Prior Arts

Hitherto, heat resistant rolls have been used as rolls for conveying and grasping steel plate heated to a high temperature, in continuous annealing apparatus and the like. These conventional heat resistant rolls have been provided in the form of metalized roll of chromium oxide or tungsten carbide, rubber roll of heat resistant rubber, fiber roll of heat resistant fiber such as heat resistant polyester fiber or the like.

A serious problem, however, exists in that when employing any of the conventional heat resistant rolls, the heat resistant roll may pick up metal powder existing on the surface of steel plate resulting in sticking of such metal powder to the surface of the heat resistant roll. Further, when baking a coating material after applying the coating material to the surface of a steel plate and conveying the steel plate after the baking, there arises a problem that heat resistant roll may pick up unbaked coating material which may stick to the surface of the heat resistant roll. Furthermore, when applying a zinc galvanization to a surface of steel plate and conveying the steel plate after the zinc galvanization, there arises a problem that heat resistant roll may pick up the galvanizing zinc which may stick to the surface of the heat resistant roll. Moreover, scratch may occur on the surface of conveyed plate, coating layer or galvanization layer due to the sticking metal powder, coating material or zinc, eventually resulting in reduction in the yield of steel plate.

To overcome the mentioned disadvantages pertinent to the prior arts, the inventors have been engaged in various researches for the reason why the conventional heat resistant rolls may pick up metal powder, etc. As a result of the researches, it was acknowledged by the inventors that any of the conventional rolls had affinity with metal powder, coating material, etc. under high temperature. More specifically, it was recognized by the inventors that surface of the conventional metalized roll, etc. and metal powder, etc. are very affinitive with each other and, accordingly, metal powder, etc. is easy to stick to the surface of the roll, which results in undesirable phenomenon of picking up metal powder, etc.

SUMMARY OF THE INVENTION

Therefore, the inventors have been engaged in studying materials having poor affinity with metal powder, coating material, etc. and superior in heat resistance under high temperature, thus reaching the present invention.

To accomplish the foregoing, there is provided according to the present invention a heat resistant roll for use in steel plate manufacturing equipment, characterized in that outer periphery of said heat resistant roll applied in contact with steel plate heated to a high temperature is comprised of para aromatic polyamide fiber.

Since outer periphery of the heat resistant roll according to the invention is comprised of para aromatic polymide fiber of poor affinity with metal powder, etc., when employing this heat resistant roll in steel plate manufacturing equipment including continuous annealing apparatus and the like for treating steel plate at high temperature, there is less possibility that the heat resistant roll picks up metal powder, unbaked coating material, galvanizing zinc, etc. existing on the surface of steel plate. As a result, a significant advantage is exhibited such that metal powder, etc. is hard to stick to the surface of the heat resistant roll, and that surface of steel plate or coating or galvanizing layer thereof is successfully prevented from being scratched by the metal powder, etc. sticked to the surface of the heat resistant roll, eventually resulting in significant improvement in productivity or yield of steel plate product in terms of quality.

Other objects, features and advantages of the invention will become apparent in the course of the following description in conjuction with the accompanying drawings: wherein, FIG. 1 is a schematic view showing a continuous annealing apparatus for annealing steel plates;

DESCRIPTION OF THE PREFERRED EMBODIMENT

The present invention is hereinafter described in detail with reference to the accompanying drawings.

Figure 1:
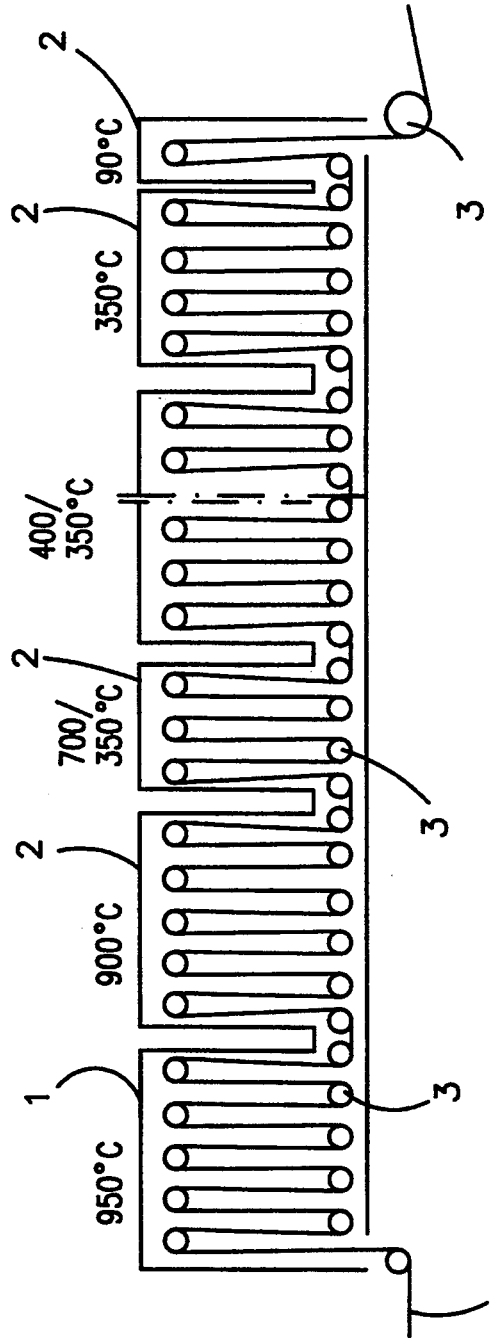

FIG. 1 shows a schematic view of a continuous annealing apparatus which is one of steel plate manufacturing equipments. The continuous annealing apparatus generally comprises a heating furnace 1 and heating down furnaces 2. Temperature of the heating furnace 1 and that of the heating down furnaces 2 are both appropriately adjusted depending upon annealing temperature. For example, the heating furnace 1 is heated to 900° C., and the heating down furnaces 2 are set to 900° C., 700° to 350° C., 400 ° to 350° C., 350° C. and 90° C., respectively. The heating furnace 1 and the heating down furnaces 2 are respectively provided with a large number of heat resistant rolls 3 for conveyance of steel plate. Accordingly, these heat resistant rolls 3 should not be changed in quality or deteriorated due to the mentioned high temperatures of 950° C. or 700° C. In the invention, heat resistant rolls 3 of which outer periphery is made of para aromatic polyamide fiber is employed as mentioned above. The para aromatic polyamide fiber is of poor affinity with metal powder existing on the surface of a steel plate A, and scarcely picks up metal powder. Accordingly, metal powder is difficult to stick to the surface of the heat resistant rolls 3, and the surface of the steel plate A under conveyance is hardly scratched by the metal powder sticked to the surface of the heat resistant rolls 3.

Figure 2:
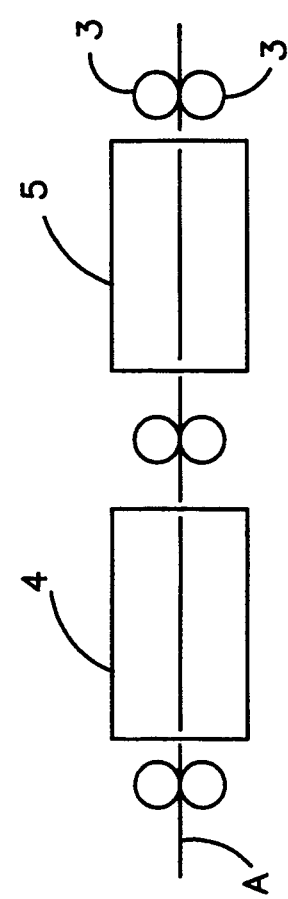
FIG. 2 is a schematic view showing a continuous coating apparatus for coating steel plate.

FIG. 2 shows a schematic view of a continuous coating apparatus which is also one of steel plate manufacturing equipments. The continuous coating apparatus generally comprises a coating section 4 for applying a coating material to the surface of the steel plate A, and a baking furnace 5 for baking the coating material applied to the surface of the steel plate A. In the baking furnace 5, it is necessary to heat over the baking temperature of the applied coating material. As a result, the steel plate A is also exposed to a high temperature, for which heat resistant rolls 3 are to be disposed on the exit side of the baking furnace 5. In the invention, outer periphery of such heat resistant rolls 3 are formed of para aromatic polyamide fiber. Under high temperature, the para aromatic polyamide fiber is not affinitive with uncured coating material remaining on the surface of the steel plate A after the baking step, and therefore there is less possibility of picking up the uncured coating material. As a result, uncured coating material is difficult to stick to the surface of the heat resistant rolls 3, and the surface of the steel plate A under conveyance is hardly scratched by the uncured coating material sticked to the surface of the heat resistant rolls 3.

Figure 3:
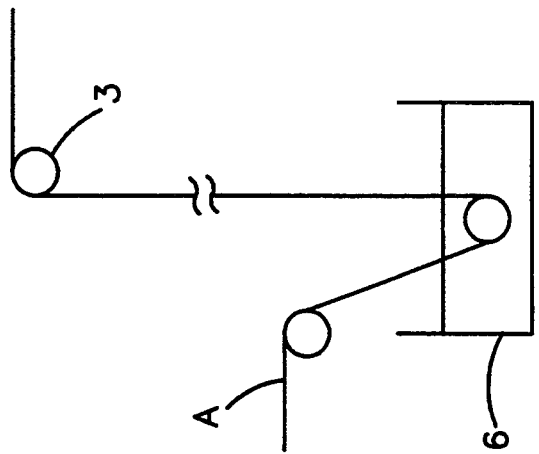
FIG. 3 is a schematic view showing a continuous zinc galvanizing apparatus for galvanizing steel plate.

FIG. 3 shows a schematic view of a continuous zinc galvanizing apparatus. The continuous zinc galvanizing apparatus generally comprises a galvanization tank 6 for accommodating a molten zinc. Zinc galvanization is applied to the surface of the steel plate A by passing the steel plate A through the galvanization tank 6. Because of high temperature of the molten zinc, the steel plate is also exposed to a high temperature, for which heat resistant rolls 3 are to be disposed on the exit side of the galvanization tank 6. In the invention, outer periphery of such heat resistant rolls 3 are formed of para aromatic polyamide fiber. Under high temperature, the para aromatic polyamide fiber is not affinitive with zinc galvanized on the surface of the steel plate A, and there is less possibility of picking up the zinc. As a result, zinc is difficult to stick to the surface of the heat resistant rolls 3, and galvanizing layer of the steel plate A under conveyance is hardly scratched by the zinc sticked to the surface of the heat resistant rolls 3.

As described above, the heat resistant rolls 3 according to the invention are mainly applied to the continuous annealing apparatus for annealing steel plates, exit side of the baking furnace 5 of the continuous coating apparatus for coating steel plate, or the exit side of the galvanization tank 6 of the continuous zinc galvanizing apparatus for galvanizing steel plate. It is also preferable that the heat resistant roll 3 according to the invention is disposed in any other required portion of various steel plate manufacturing equipments. Average roughness of the center line on the surface of the heat resistant roll described above (measured by tracer type roughness measuring instrument) is preferably in the range of 10 to 20 μm (Ra). If the average roughness of the center line is less than 10 μm (Ra), it becomes difficult to grasp or convey steel plate by the heat resistant rolls 3 and slippage may easily take place. On the other hand, if the average roughness of the center line is over 20 μm (Ra), metal powder, etc. are easy to be picked up. Hardness (measured in accordance with JIS K6301) is preferably not less than 90 degrees and, more preferably, 95 degrees and more. If the hardness is less than 90 degrees, it becomes difficult to grasp or convey steel plates by the resistant rolls 3. In addition, the term "steel plate" used in the invention includes not only ordinary steel plate but also other metal plate of aluminium, copper, etc.

Described hereinafter is a typical manufacturing process of the heat resistant rolls 3 according to the invention. First, a fiber material of para aromatic polymide fiber in the form of nonwoven-fabric, felt, woven-fabric, nitted-fabric or the like is prepared. Then, a belt member of a certain width is cut out from this fiber material. Alternatively, it is preferable produce the belt member, directly from the first, of para aromatic polyamide fiber, instead of cutting out.

Width of the belt member may be freely selected, but generally in the range of about 3 to 10 cm. Thickness the belt member may also be freely selected, but generally in the range of about 1 to 3 mm. Apparent density of the belt member may also be freely selected and not required to be extremely high, and generally in the range of about 0.4 to 0.7 g/cm$^3$.

Next step is to sew one end of a belt material i.e., either left end or right end, with a sewing thread in longitudinal direction. The belt material is composed of one belt member, or at least two belt members overlapped one another. In this sewing step, it is satisfiable to sew either one belt member or overlapping two belt members together thereby forming one sewn material. It is also satisfiable to combine two such sewn materials by further sewing them together respectively formed of two belt members (in this case, a secondary sewn belt material formed of four belt members is obtained). What is essential in the sewing step is to sew one end in such a manner that the one end may be undulated or gathered a little, whereby longitudinal length of the one end may be shorter than longitudinal length of another free end. More specifically, it is essential in the sewing by means of a sewing machine to establish a difference in tensile strength between a needle thread and a bobbin thread, and sew one end while drawing with either thread having higher tensile strength, so that longitudinal length of sewn one end may be shorter than that of another free end as mentioned above. Tensile strength for the needle thread or bobbin thread may be freely selected, but it is preferred to give about 10 kg of tensile strength to the needle thread while giving about 20 kg of tensile strength to the bobbin thread. For carrying out the sewing step manually, it is required to sew one end while shortening the longitudinal length thereof a little, so that longitudinal length of the sewn one end may be shorter than that of another end. In addition, any sewing thread may be freely employed, and it is particularly preferred to employ a sewing thread comprised of the same kind of fiber as the fiber forming the belt material.

Figure 4:
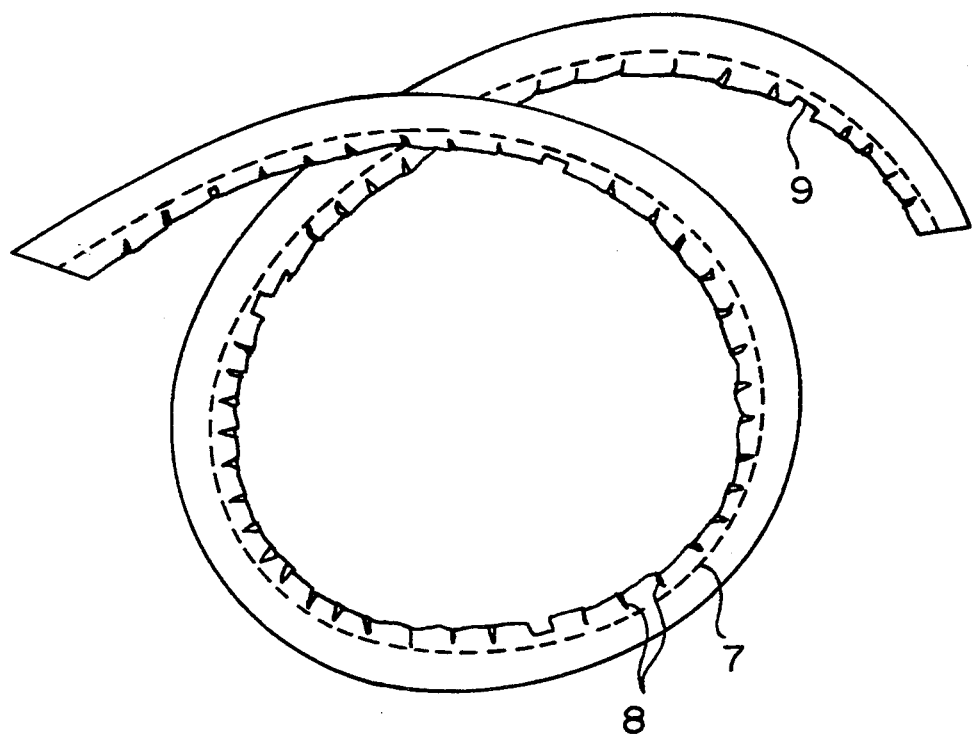
FIG. 4 is a plan view showing a belt material of which one end is sewn with a sewing thread.

When sewing the belt material with the sewing thread in the mentioned manner, longitudinal length of one end becomes shorter than that of another end, whereby a circulatar arc is formed such that the sewn one end occupies inside while another end occupying outside, as shown in FIG. 4, for example. In the drawing, reference numeral 7 denotes a sewing thread, numeral 8 denotes wrinkles appeared as a result of shortening the longitudinal length of one end, numeral 9 denotes concave parts formed corresponding to convex parts for prevention of idle rotation formed on the roll shaft. Radius of curvature of this circular arc may be set to be equivalent to radius of a roll shaft to be mounted. Radius of curvature of the circular arc may be freely selected depending upon the measure of shortening the longitudinal length of sewn one end.

Then, the sewn belt material formed into such a circular arc member is taken up or wound round a roll shaft in such a manner that a thick surface of one end comes in contact with the roll shaft. In case that longitudinal length of the sewn belt material in endless, the sewn belt material may be easily mounted on the roll shaft by continuously winding the sewn belt material spirally round the roll shaft. In case of the sewn belt material of limited length, after spirally winding up a sewn belt material of such limited length, another sewn belt material belt may be superposingly wound round in continuation to the end of the preceding sewn belt material. Then, in the same manner as the conventional fiber roll using doughnut-shaped disks, compression molding is axially applied from two opposite sides, followed by lathe machining into a roll-shaped product, and further followed by impregnation with a resin, thus finally obtaining a fiber roll of desired hardness.

It is also preferred that the sewn belt material is further subject to a drawing treatment and thereafter wound round the roll shaft, instead of winding the sewn belt material as it is. When applying such a drawing treatment beforehand, the sewn belt material is desirably less stretchable at the step of winding. It is also satisfiable that, instead of winding directly round the roll shaft, a fiber roll is obtained by winding the sewn belt material round a provisional shaft, molding the wound material compressively from two sides in the axial direction, thereby forming the compressed material into a roll, impregnating the roll with resin, removing the provisional shaft out of the roll to obtain a hollow cylinder formed of sewn belt material, and mounting the hollow cylinder on the roll shaft.

EXAMPLE 1

A para aromatic polyamide fiber of 1.5 denier in fineness was employed to prepare a sheet-like felt of 400 g/m² in unit weight and 2.5 mm in thickness. Belt-like felts (belt members) each of 50 mm in width were cut out from this sheet-like felt. Two belt-like felts were then overlapped each other, and right end of the overlapping two belt-like felts was longitudinally sewn by means of a sewing machine, whereby a primary sewn belt material comprised of two partially sewn belt-like felts was obtained. This primary sewn material was shaped into circular arc with its right side curved. Further, two such primary sewn materials were overlapped each other, and right end of the overlapping two primary sewn materials was longitudinally sewn by means of a sewing machine, whereby a secondary sewn belt material comprised of two (partially sewn) primary sewn materials was obtained. This secondary sewn material was also shaped into circular arc with its right side curved. In the sewing step, 10 kg of tensile strength was applied to the needle thread, while applying 20 kg of tensile strength to the bobbin thread. A thread of para aromatic polyamide multifilaments was employed as both needle and bobbin threads.

Concaves formed corresponding to convexes for prevention of idle rotation formed on the roll shaft were formed on the thick face on the right side of the obtained secondary sewn material. Then, the secondary sewn material was rolled spirally in such a manner that the thick face on the right side of the secondary sewn material may come in contact with the surface of the roll shaft, whereby a cylindrical material was prepared. This cylindrical material was then subject to a compression molding in such a manner as to be compressed axially from two sides of the roll shaft. The cylindrical material in such a compressively molded state was then formed into a roll. Subsequently, the rolled cylindrical material was impregnated with a ceramic coating agent (of which solid portion was 30% by weight) of under-described prescription, then dried and cured at 140° C. for 90 min, thus a final roll being obtained. In this roll, solid portion of the ceramic coating agent was contained in the proportion of 10 g to 100 cm³ of the cylindrical material.

Prescription of Ceramic Coating Agent

Main component: silicon oxide
Solvent: isopropyl alcohol
Viscosity: 900 cp
Density: 1.3
pH: 12

The heat resistant roll obtained in the mentioned manner was 1500 mm in external diameter, and 1500 mm also in width. Density of the cylindrical material was 0.61 g/cm³ and hardness thereof was 95 degrees. Average roughness of the center line on the surface was 10 to 20 μm (Ra).

The heat resistant rolls were then applied to inside of a heating furnace in a continuous annealing apparatus and to exit said of a heating down furnace as a deflector roll. Treatment conditions of steel plate were as follows:

Thickness of steel plate: 0.4 to 2.0 mm
Width of steel plate: 750 to 1280 mm
Treating rate of steel plate: 200 m/min
Temperature of steel plate: 100° to 350° C.

As a result of above application, it was acknowledged that there was substantially no pick-up of metal powder from the surface of steel plate to the surface of this heat resistant roll, whereby the steel plate was prevented from being scratched by metal powder sticked to the surface of the heat resistant roll. Furthermore, the surface of the heat resistant roll was sufficiently stable being free from crack, peeling, carbonization, etc., thus the heat resistant roll was able to be operated continuously for 180 days without recondition of the surface.

EXAMPLE 2

In the same manner as the foregoing Example 1, a heat resistant roll was obtained. This heat resistant roll was 520 mm in external diameter, 1400 mm in width, 95 degrees in hardness of the cylindrical material, and 16 μm (Ra) in average roughness of the center line on the surface.

This heat resistant roll was then applied to exit side of a baking furnace in a continuous coating apparatus. Treatment conditions of steel plate were as follows:

Thickness of steel plate: 0.27 to 1.6 mm
Width of steel plate: 610 to 1250 mm
Treating rate of steel plate: 77 m/min
Temperature of steel plate: 180° to 230° C.

As a result of above application, it was acknowledged that there was substantially no pick-up of uncured coating material from the surface of steel plate to the surface of this heat resistant roll, whereby coating layer of the steel plate was prevented from being scratched by uncured coating material sticked to the surface of the heat resistant roll. In this regard, it has been heretofore known that a steel roll is employed as a deflector roll and in which water is applied to the surface of the steel roll in the form of open cooling so as to prevent the roll from overheat and from picking up uncured coating material. In such conventional system, there arises a disadvantage of generating smoky steam negatively affecting the work environment worse. The conventional open cooling with water is no more necessary when employing the heat resistant roll according to the invention. As a result, the mentioned disadvantage of negative affection on the work environment is successfully prevented.

EXAMPLE 3

In the same manner as the foregoing Example 1, a heat resistant roll was obtained. This heat resistant roll was 900 mm in external diameter, 2600 mm in width, 95 to 99 degrees in hardness of the cylindrical material, and 12 μm (Ra) in average roughness of the center line on the surface.

This heat resistant roll was then applied as a for use in a continuous electromagnetic induction heating and annealing apparatus. Aluminium plate and copper plate were used as metal plate to be worked. Treatment conditions were as follows:
Treating rate of metal plate: 750 to 350 m/min
Temperature of metal plate: 200° to 350° C.

As a result of above application, it was acknowledged that there was substantially no pick-up of metal powder from the surface of aluminium or copper plate to the surface of this heat resistant roll, whereby the aluminium or copper plate was prevented from being scratched by metal powder sticked to the surface of the heat resistant roll. Furthermore, because of low hardness, i.e., mildness of aluminium or copper plate as compared with ordinary steel plate, damage on the surface of the heat resistant roll itself was in small degree, and deformation of the surface of the heat resistant roll was also small keeping well circularity and cylindricity, thus the heat resistant roll was able to be operated continuously for 300 days without recondition of the surface.

EXAMPLE 4

In the same manner as the foregoing Example 1, a heat resistant roll was obtained. This heat resistant roll was 1500 mm in external diameter, 1500 mm also in width, 95 degrees in hardness of the cylindrical material, and 16 μm (Ra) in average roughness of the center line on the surface.

The heat resistant roll was then applied as a top roll to exit side of a galvanization tank in a continuous zinc galvanizing apparatus. Treatment conditions of steel plate were as follows:
Thickness of steel plate: 0.27 to 2.7 mm
Width of steel plate: 610 to 1250 mm
Tensible strength of steel plate: 45 kg/mm$^2$
Treating rate of steel plate: 150 m/min
Distance between galvanization tank and top roll: 17160 mm As a result of above application, it was acknowledged that there was substantially no pick-up of the galvanizing zinc from the surface of the steel plate to the surface of this heat resistant roll, whereby the steel plate was prevented from being scratched by zinc sticked to the surface of the heat resistant roll. In this regard, it has been conventional that zinc picked up during operation of the apparatus must be removed from the top roll, and moreover outer periphery of the roll must be ground or reconditioned every 4 months. On the contrary, in the heat resistant roll according to this example, it is no more necessary to remove such zinc sticked to the surface of the heat resistant roll during operation of the apparatus. The heat resistant roll was able to be operated for 6 months without grinding reconditioning outer periphery thereof. As a result, zinc galvanizing process of steel plate may be significantly improved by using this heat resistant roll.

As many apparently widely different examples of this invention may be made without departing from the spirit and scope thereof, it is to be understood that the invention is not limited to the specific examples thereof except as defined in the appended claims.

What is claimed is:

1. A heat resistant roll for use in steel plate manufacturing equipment, the roll having an outer periphery comprising a para aromatic polyamide fiber, said outer periphery coming into contact with the steel plate heated to a high temperature.

2. A heat resistant roll for use in steel plate manufacturing equipment or apparatus according to claim 1, wherein the outer periphery of the roll is made of a belt-like material which is made of the para aromatic polyamide fiber, one end of said belt-like material being sewn with a thread so that the length of said one end in the longitudinal direction is shorter than that of the other end, thereby forming a circular arc in which said one end occupies the inside surface of the arc while said other end occupies the outside surface thereof, and wherein said sewn belt-like material is mounted on a roll shaft in such a manner that a thick face of said one end of the arc shaped belt-like material comes into contact with the roll shaft.

3. A heat resistant roll for use in the exit side of a baking furnace of a continuous coating apparatus for coating steel plate with a coating material with steel plate manufacturing equipment, the roll having an outer periphery comprising a para aromatic polyamide fiber.

4. A heat resistant roll for use in steel plate manufacturing equipment or apparatus according to claim 3, wherein the outer periphery of the roll is made from a belt-like material which is made of the para aromatic polyamide fiber, one end of said belt-like material being sewn with a thread so that the length of said one end in the longitudinal direction is shorter than that of the other end, thereby forming a circular arc in which said one end occupies the inside surface of the arc while said other end occupies the outside surface thereof, and wherein said sewn belt-like material is mounted on a roll shaft in such a manner that a thick face of said one end of the arc shaped belt-like material comes into contact with the roll shaft.

5. A heat resistant roll for use in a continuous annealing apparatus for annealing steel plate with steel plate manufacturing equipment, the roll having an outer periphery comprising a para aromatic polyamide fiber.

6. A heat resistant roll for use in steel plate manufacturing equipment or apparatus according to claim 5, wherein the outer periphery of the roll is made from a belt-like material which is made of the para aromatic polyamide fiber, one end of said belt-like material being sewn with a thread so that the length of said one end in the longitudinal direction is shorter than that of the other end thereby forming a circular arc in which said one end occupies the inside surface of the arc while said other end occupies the outside surface thereof, and wherein said sewn belt-like material is mounted on a roll shaft in such a manner that a thick face of said one end of the arc shaped belt-like material comes into contact with the roll shaft.

7. A heat resistant roll for use in the exit side of a galvanizing tank of a continuous zinc galvanizing apparatus for galvanizing steel plate with zinc with steel plate manufacturing apparatus, the roll having an outer periphery comprising a para aromatic polyamide fiber.

8. A heat resistant roll for use in steel plate manufacturing equipment or apparatus according to claim 7, wherein the outer periphery of the roll is made from a belt-like material which is made of the para aromatic polyamide fiber, one end of said belt-like material being sewn with a thread so that the length of said one end in the longitudinal direction is shorter than that of the other end, thereby forming a circular arc in which said one end occupies the inside surface of the arc while said other end occupies the outside surface thereof, and wherein said sewn belt-like material is mounted on a roll shaft in such a manner that a thick face of said one of the arc shaped belt-like material end comes into contact with the roll shaft.

* * * * *